(12) United States Patent
Pak et al.

(10) Patent No.: US 7,825,361 B2
(45) Date of Patent: Nov. 2, 2010

(54) LIGHT SENSOR TEST UNIT OF TESTING A LIGHT SENSOR THAT SENSES AN EXTERNAL LIGHT, METHOD OF TESTING LIGHT SENSOR USING THE SAME AND DISPLAY APPARATUS

(75) Inventors: Sang-Jin Pak, Yongin-si (KR); Kee-Han Uh, Yongin-si (KR); Ho-Suk Maeng, Seoul (KR); Man-Seung Cho, Seoul (KR); Young-Ok Cha, Gwangmyeong-si (KR)

(73) Assignee: Samsung Electronics Co., Ltd. (KR)

( * ) Notice: Subject to any disclaimer, the term of this patent is extended or adjusted under 35 U.S.C. 154(b) by 16 days.

(21) Appl. No.: 12/260,420

(22) Filed: Oct. 29, 2008

(65) Prior Publication Data
US 2009/0152441 A1   Jun. 18, 2009

(30) Foreign Application Priority Data
Dec. 18, 2007   (KR) .................... 10-2007-0133496

(51) Int. Cl.
*G01J 1/32* (2006.01)
*G09G 3/36* (2006.01)
*G06F 3/038* (2006.01)
(52) U.S. Cl. .................. 250/205; 345/102; 345/207; 250/214 AL
(58) Field of Classification Search ................ 250/205, 250/214 AL; 345/81, 205, 102; 324/752
See application file for complete search history.

(56) References Cited

U.S. PATENT DOCUMENTS

| 6,081,254 A | * | 6/2000 | Tanaka et al. | 382/167 |
| 7,345,669 B2 | * | 3/2008 | Ohashi et al. | 345/102 |
| 2007/0272831 A1 | * | 11/2007 | Dailey et al. | 250/214 AL |

FOREIGN PATENT DOCUMENTS

JP   2003131798   5/2003

* cited by examiner

*Primary Examiner*—Thanh X Luu
(74) *Attorney, Agent, or Firm*—Cantor Colburn LLP

(57) ABSTRACT

In a light sensor test unit, a test circuit is built in a display panel and connected to an output node of a light sensor which senses an intensity of an external light. When external light having a predetermined intensity is provided to the light sensor, the test circuit outputs a driving signal in response to a sensing signal output from the output node. A test pixel part includes pixels selected from a plurality of pixels arranged in the display panel and receives the driving signal from the test circuit to display a gray-scale corresponding to the driving signal. A brightness measurer measures a brightness corresponding to the gray-scale displayed in the test pixel part to compare the measured brightness with a predetermined brightness, thereby testing whether the light sensor built in the display panel is normally operated.

8 Claims, 7 Drawing Sheets

LIGHT SENSOR TEST UNIT OF TESTING A LIGHT SENSOR THAT SENSES AN EXTERNAL LIGHT, METHOD OF TESTING LIGHT SENSOR USING THE SAME AND DISPLAY APPARATUS

This application claims priority to Korean Patent Application No. 2007-133496 filed on Dec. 18, 2007, and all the benefits accruing therefrom under 35 U.S.C. §119, the contents of which in its entirety are herein incorporated by reference.

BACKGROUND OF THE INVENTION

1. Field of the Invention

The present invention relates to a light sensor test unit, a method of testing a light sensor using the light sensor test unit, and a display apparatus. More particularly, the present invention relates to a light sensor test unit capable of testing a light sensor built in a display panel, a method of testing the light sensor, and a display apparatus.

2. Description of the Related Art

In general, a liquid crystal display ("LCD") uses a liquid crystal which is a passive light element incapable of emitting light itself, so that an LCD panel receives a light from an exterior to display an image. The LCD is classified into two types according to the light used to display the image. That is, the LCD is classified into a transmissive LCD which uses an internal light generated from an inner light source to display the image and a reflective LCD which uses an external light generated from an outer light source to display the image.

In a transmissive LCD, a backlight is arranged under the LCD panel to provide a light to the LCD panel. The backlight consumes more than 70% of electric power used in the LCD. Thus, recently, a method which reduces the power consumption of the backlight by decreasing an intensity of the internal light generated from the backlight is suggested when an intensity of the external light applied from the exterior to the LCD. In order to sense the intensity of the external light, a light sensor is added to the LCD.

The light sensor is classified into two types. One is an internal type light sensor formed through a thin film process on the display panel and built in the display panel, and the other is an external type light sensor attached to the exterior of one side of the display panel module. The external type light sensor is separable from the display panel module, so that it is easier to test whether the light sensor is normally operated. However, the external type light sensor causes an increase of the LCD in size and an assembling process of the LCD becomes complicated by adding the external light sensor.

Accordingly, the built-in type light sensor has been widely employed recently. However, when using the built-in light sensor, it is difficult to test the operation of the light sensor and a technique which tests the built-in type light sensor has not been developed yet. Also, when the test process of the built-in type light sensor is omitted, a reliability of the display panel decreases.

BRIEF SUMMARY OF THE INVENTION

The present invention has been made in an effort to solve the above-stated problems, and an aspect of the present invention provides a light sensor test unit capable of effectively testing a light sensor which is built in a display panel, to sense an external light.

The present invention also provides a method of testing a light sensor using the light sensor test unit.

The present invention also provides a display apparatus having the light sensor test unit.

In an exemplary embodiment, the present invention provides a light sensor test unit including a test circuit, a test pixel part, a brightness measurer, and a controller in order to test a light sensor which is built in a display panel.

According to an exemplary embodiment, the test circuit is connected to an output node of the light sensor and outputs a driving signal in response to a sensing signal output from the output node, when an external light having a predetermined intensity is applied to the light sensor.

According to an exemplary embodiment, the test pixel part includes pixels selected from a plurality of pixels arranged in the display panel, and receives the driving signal from the test circuit to display a gray-scale corresponding to the driving signal. The brightness measurer measures a brightness corresponding to the gray-scale displayed on the test pixel part, and the controller compares the measured brightness and the predetermined brightness to test whether the light sensor is normally operated.

In another exemplary embodiment, the present invention provides a method of testing a light sensor which is built in a display panel, to sense an external light using the light sensor test unit, the method including providing a predetermined external light to the light sensor, outputting a sensing signal corresponding to the external light through an output node of the light sensor, outputting a driving signal to pixels selected from a plurality of pixels arranged in the display panel in response to the sensing signal, displaying a gray-scale corresponding to the driving signal through the selected pixels, measuring a brightness corresponding to the gray-scale in a region where the selected pixels are arranged, and comparing the measured brightness with a predetermined reference brightness to test whether the light sensor is normally operated.

According to an exemplary embodiment, the outputting of the driving signal in response to the sensing signal further includes switching the sensing signal in response to an enable signal, outputting either a first voltage or a second voltage as the driving voltage in response to the sensing signal, and switching the driving signal in response to the enable signal.

According to an exemplary embodiment, the first voltage is a driving voltage of the display panel, and the second voltage is a ground voltage.

According to an exemplary embodiment, the first voltage is output as the driving signal when the sensing signal is at low level, and the second voltage is output as the driving signal when the sensing signal is at high level.

According to an exemplary embodiment, prior to providing the predetermined external light to the light sensor, further includes applying a sensing gate signal in a high state to the light sensor to output the sensing signal in a high state through the output node, changing the sensing signal in the high state to the second voltage in response to the enable signal, and initializing the driving signal applied to the selected pixels to the second voltage in response to the enable signal.

According to an exemplary embodiment, prior to outputting the driving signal to the selected pixels, further includes applying a gate signal to the pixels arranged in the display panel.

In another exemplary embodiment, the present invention provides a display apparatus which includes a backlight, a display panel, a backlight driver, and a display panel driver.

According to an exemplary embodiment, the backlight unit generates an internal light. The display panel includes a plurality of pixels arranged in a display area and receives the internal light to display an image, and a light sensor arranged in a black matrix area adjacent to the display area and outputs a sensing signal corresponding to an intensity of an external light. The backlight driver receives the sensing signal to control an intensity of the internal light generated from the backlight unit, and the display panel driver drives the pixels arranged in the display panel.

According to an exemplary embodiment, the display panel includes a test circuit which is connected to an output node of the light sensor and outputs a driving signal in response to the sensing signal output from the output node of the light sensor when the external light having a predetermined intensity is provided to the light sensor in order to test the light sensor. Thus, when the selected pixels receive the driving signal to display the gray-scale corresponding to the driving signal during a test process of the light sensor, the light sensor test unit uses the brightness measurer to measure the brightness corresponding to the gray-scale, and tests whether the light sensor is normally operated based on the measured brightness.

According to the above, the test circuit connected to the light sensor is arranged on the display panel to test the light sensor which senses the intensity of the external light. The brightness of the pixels operated by the test circuit is measured by the brightness measurer. Thus, the light sensor test unit may test whether the light sensor is normally operated or not.

BRIEF DESCRIPTION OF THE DRAWINGS

The above and/or other aspects, features, and advantages of the present invention will become readily more apparent by reference to the following detailed description when considered taken in conjunction with the accompanying drawings in which.

DETAILED DESCRIPTION OF THE INVENTION

Figure 1:
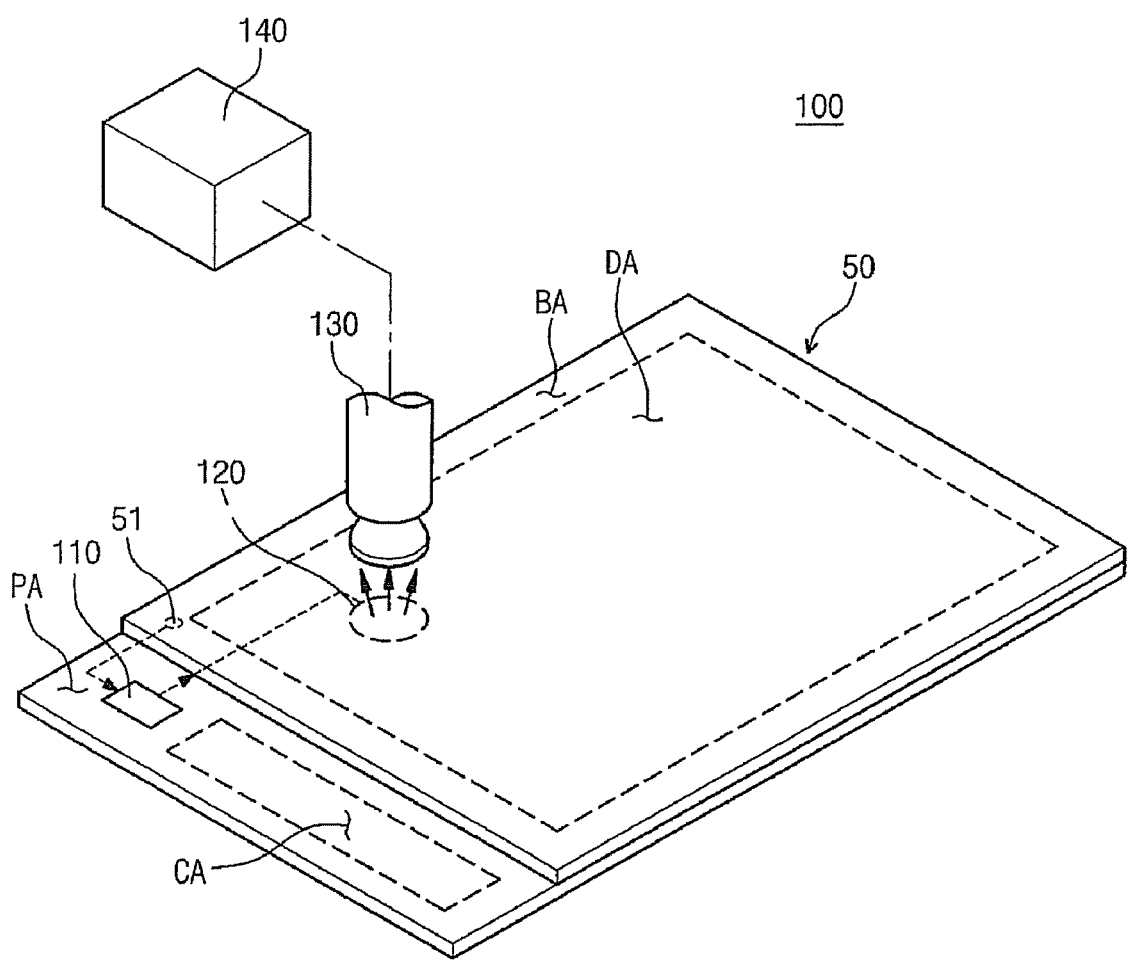
FIG. 1 is a perspective view showing an exemplary embodiment of a light sensor test unit according to the present invention.

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a perspective view showing an exemplary embodiment of a light sensor test unit according to the present invention.

Referring to FIG. 1, a light sensor test unit 100 is applied to test a light sensor 51 which is built in a display panel 50 which displays an image to sense an external optical environment (e.g., an intensity of an external light) of the display panel 50.

The built-in light sensor 51 is built in the display panel 50 through a thin film process which forms a plurality of pixels in the display panel 50, so that the light sensor 51 may not be tested through a testing method for an external type light sensor.

Thus, the light sensor test unit 100 includes a test circuit 110, a test pixel part 120, a brightness measurer 130, and a controller 140 in order to test the built-in light sensor 51 in the display panel 50.

When an external light having a predetermined intensity is provided to the built-in light sensor 51 in order to test the built-in light sensor 51, the built-in light sensor 51 outputs a sensing signal corresponding to the intensity of the external light. The test circuit 110 is connected to an output node of the built-in light sensor 51 to receive the sensing signal and changes the sensing signal to a driving signal to output the driving signal. Circuit diagrams of the test circuit 110 will be described in detail with reference to FIG. 2.

The test pixel part 120 includes pixels selected from the pixels formed in the display panel 50 and the selected pixels are electrically connected to the test circuit 110. Accordingly, the test pixel part 120 receives the driving signal from the test circuit 110 and displays a gray-scale corresponding to the driving signal. In the current exemplary embodiment, the number of selected pixels of the test pixel part 120 may vary.

The brightness measurer 130 is arranged adjacent to the test pixel part 120 and measures a brightness corresponding the gray-scale displayed by the test pixel part 120 when the test pixel part 120 displays the gray-scale corresponding to the driving signal. A brightness data measured by the brightness measurer 130 is transmitted to the controller 140, and the controller 140 compares a predetermined reference brightness data with the measured brightness data to test whether the built-in light sensor 51 is normally operated.

As shown in FIG. 1, the display panel 50 further includes a display area DA on which an image is displayed, a black matrix area BA which surrounds the display area DA, and a peripheral area PA arranged outside of the black matrix area BA. Since the pixels are arranged in the display area DA and the test pixel part 120 includes the selected pixels among the pixels, the test pixel part 120 is positioned in the display area DA.

Meanwhile, a black matrix is arranged in the black matrix area BA in order to block leakage of an internal light (e.g., an incident light from a backlight (not shown) of the display panel) provided from a rear portion of the display panel 50. The built-in light sensor 51 is arranged in the black matrix area BA, and the black matrix is partially removed in a region in which the built-in light sensor 51 is formed, so that the external light may be applied to the built-in light sensor 51.

The test circuit 110 is arranged in the peripheral area PA, and the test circuit 110 is electrically connected to the built-in light sensor 51 and the test pixel part 120 through wires. Especially, the test circuit 110 is arranged outside of a chip mounting area CA of the peripheral area PA, in which a driving chip (not shown) is mounted on the display panel 50.

Figure 2:
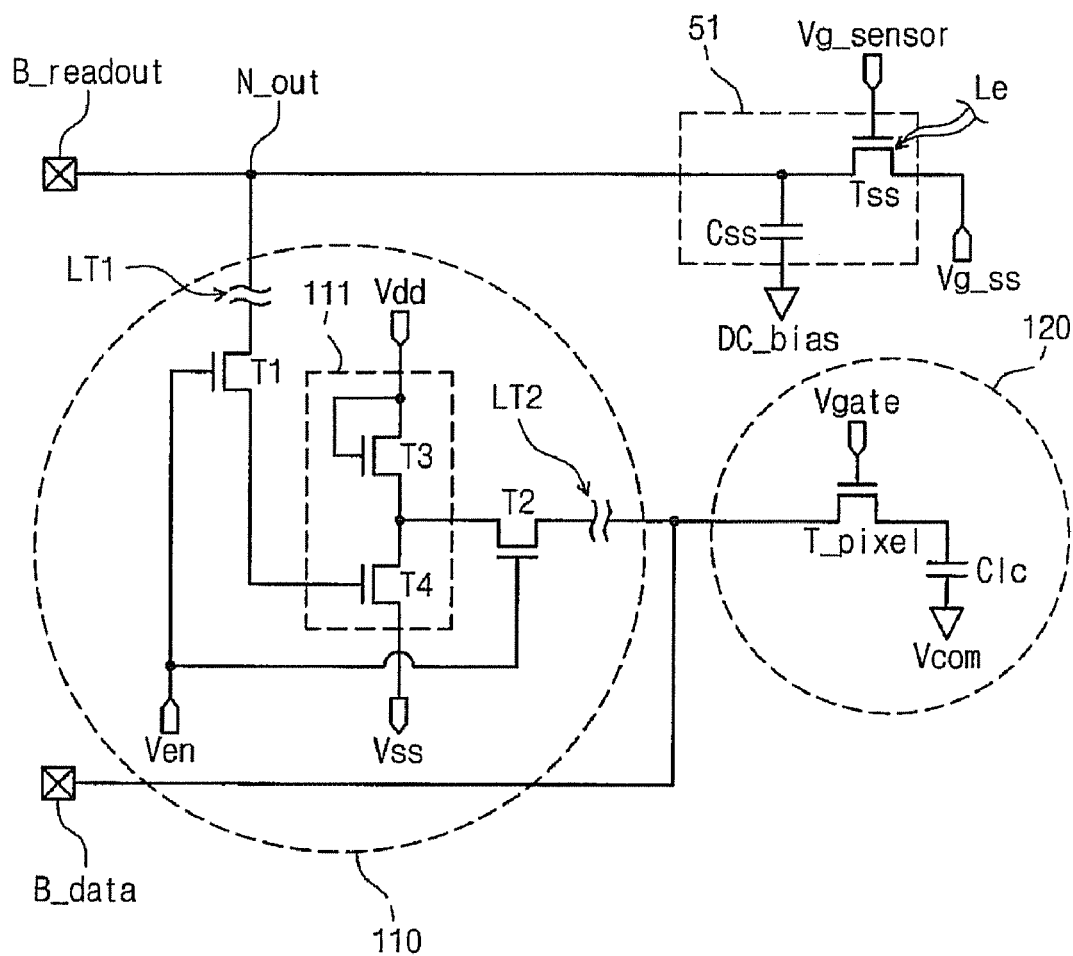
FIG. 2 is a circuit diagram showing a connection relation between a light sensor, a test circuit, and a test pixel part of FIG. 1.
Figure 3:
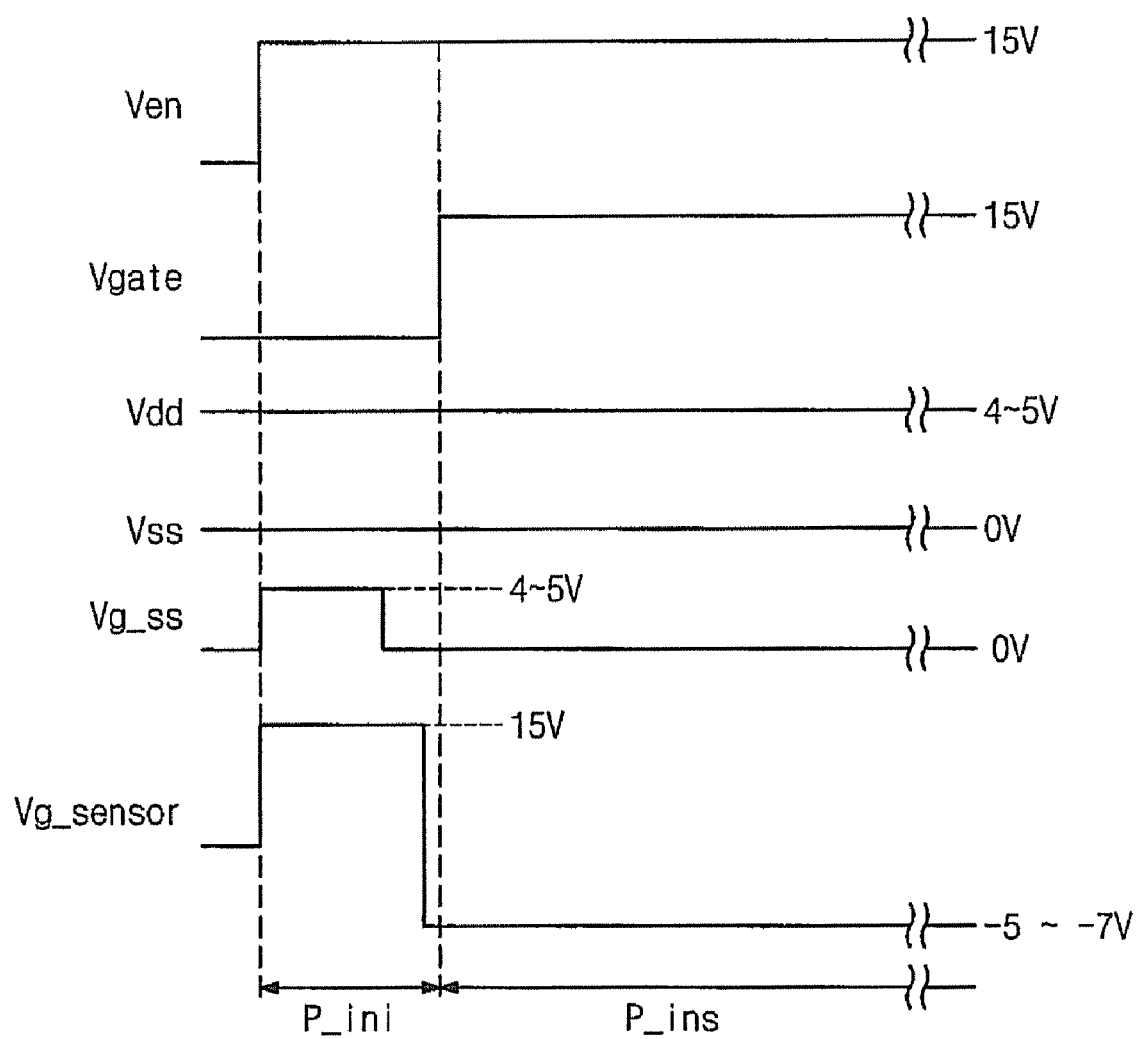
FIG. 3 is a waveform diagram showing signals of FIG. 2.

FIG. 2 is a circuit diagram showing a connection relation between the light sensor, the test circuit, and the test pixel part of FIG. 1, and FIG. 3 is a waveform diagram showing signals of FIG. 2.

Referring to FIGS. 2 and 3, the built-in light sensor 51 includes a sensing transistor Tss and a sensing capacitor Css. The sensing transistor Tss includes a control electrode to which a first gate signal Vg_sensor is applied, an input electrode to which a source signal Vg_ss is applied, and an output electrode outputting the sensing signal. The sensing capacitor Css is connected between the output electrode and a terminal to which a direct bias voltage DC-bias is applied. In the current exemplary embodiment, the output node N_out of the built-in light sensor 51 is defined as a node to which the output electrode of the sensing transistor Tss and the sensing capacitor Css are connected.

During a test period P_ins, the first gate signal Vg_sensor having a negative voltage level (−) (for instance, from approximately −5V to approximately −7V) is applied to the control electrode of the sensing transistor Tss, and the source signal Vg_ss having a voltage level of approximately 0 volts is applied to the input electrode of the sensing transistor Tss. When the predetermined external light Le is provided to the sensing transistor Tss, the built-in light sensor 51 outputs a photo current corresponding to the external light Le. The photo current is transmitted from the output electrode to the input electrode of the sensing transistor Tss. Therefore, an electric potential of the output node N_out of the built-in light sensor 51 is dropped, and thus a sensing signal in a low state is output from the output node N_out of the built-in light sensor 51.

According to an exemplary embodiment, the test circuit 110 includes a first transistor T1, an inverter 111, and a second transistor T2. The first transistor T1 includes an input electrode connected to the output node N_out, a control electrode receiving an enable signal Ven, and an output electrode connected to an input terminal of the inverter 111. The second transistor T2 includes a control electrode receiving the enable signal Ven, an input electrode connected to an output terminal of the inverter 111, and an output electrode connected to the test pixel part 120. The inverter 111 includes a third transistor T3 and a fourth transistor T4. The third transistor T3 includes a control electrode and an input electrode commonly connected to a first voltage terminal to which a first voltage Vdd is applied and an output electrode connected to the input electrode of the second transistor T2. The fourth transistor T4 includes a control electrode connected to the output electrode of the first transistor T1, an input electrode connected to an output electrode of the third transistor T3, and an output electrode connected to a second voltage terminal to which a second voltage Vss is applied.

During the test period P_ins, the first and second transistors T1 and T2 are turned on in response to the enable signal Ven in a high state. According to an exemplary embodiment of the present invention, the enable signal Ven is a voltage signal having a voltage level of approximately 15V. The turned-on first transistor T1 provides the sensing signal output from the light sensor 51 to the inverter 111. The inverter 111 outputs either the first voltage Vdd or the second voltage Vss as the driving signal in response to the sensing signal input through the first transistor T1. As shown in FIG. 3, during the test period P_ins, the first voltage Vdd has a voltage level of approximately 4V to 5V, and the second voltage Vss includes a voltage level of approximately 0V.

Since the third transistor T3 is operated as a diode, the first voltage Vdd is output from the output electrode of the third transistor T3. When the sensing signal in a low state is output from the first transistor T1, the fourth transistor T4 is turned off, and as a result, the first voltage Vdd is output as the driving signal through the turned-on second transistor T2.

Meanwhile, each pixel arranged in the test pixel part 120 includes a pixel transistor T_pixel and a liquid crystal capacitor Clc. The pixel transistor T_pixel includes a control electrode receiving a second gate signal Vgate, an input electrode connected to the output electrode of the second transistor T2, and an output electrode connected to the liquid crystal capacitor Clc. The liquid crystal capacitor Clc is arranged between the output electrode of the pixel transistor T_pixel and a common electrode to which a common voltage is applied.

During the test period P_ins, the second gate signal Vgate in a high state is applied to the control electrode of the pixel transistor T_pixel. According to an exemplary embodiment of the present invention, the second gate signal Vgate includes a voltage level of approximately 15V When the pixel transistor T_pixel is turned on in response to the second gate signal Vgate, the first voltage Vdd output from the test circuit 110 as the driving signal is charged to the liquid crystal capacitor Clc through the pixel transistor T_pixel. Thus, the pixels arranged in the test pixel part 120 display a gray-scale corresponding to the first voltage Vdd. Since a test procedure after the above-mentioned procedure is described in detail with reference to FIG. 1, the test procedure will be omitted.

According to an exemplary embodiment of the present invention, a procedure which initializes the signal output from the test circuit 110 may be performed prior to the above-mentioned test.

As shown in FIG. 3, the enable signal Ven is maintained at the high state during an initialization period P_ini, the source signal Vg_ss is maintained at a voltage level of approximately 4V to 5V, and the first gate signal Vg_sensor has a voltage level that is increased to approximately 15V.

Accordingly, during the initialization period P_ini, the electric potential of the output node N_out of the built-in light sensor 51 increases to approximately 4V to approximately 5V by the sensing transistor Tss that is turned on in response to the first gate signal Vg_sensor. The voltage output from the output node N_out is applied to the control electrode of the fourth transistor T4 through the turned-on first transistor T1. Then, the fourth transistor T4 is turned on, and the first voltage Vdd output from the third transistor T3 is discharged through the fourth transistor T4. Thus, the test circuit 110 outputs the second voltage Vss as the driving signal during the initialization period P_ini. That is, the driving signal output from the test circuit 110 may be initialized as the second voltage Vss.

As shown in FIG. 2, the display panel 50 further includes a readout bump B_readout and a data bump B_data. The readout bump B_readout is used to electrically connect a driving chip (not shown) that is mounted on the display panel 50 and the built-in light sensor 51, and the readout bump B_readout is electrically connected to the output node N_out of the built-in light sensor 51 through wires. Also, the data bump B_data is used to electrically connect the driving chip and the pixels arranged in the test pixel part 120 and to provide a data signal output from the driving chip to the pixels. Accordingly, the data bump B_data is electrically connected to the input electrode of the pixel transistor T_pixel arranged in the test pixel part 120.

Although not shown in FIG. 2, a plurality of gate lines and a plurality of data lines are arranged in the display area DA of the display panel 50. During a visual test procedure for test of the display panel 50, the data lines are electrically connected with each other through a connection line. Then, a test signal is applied to a test pad which is branched from the connection line, so that the display panel 50 is operated and the visual test is performed. The data lines may be divided into two groups that may be electrically connected to each other.

Meanwhile, a gate driver that outputs a gate signal to the gate lines may be directly built in the display panel 50. During the visual test procedure, control signal wires that receive various control signals for driving the gate driver are electrically connected through a connection line. Then, the test signal is applied to the test pad that is branched from the connection line, thereby operating the display panel 50 and performing the visual test.

When the visual test is completed, according to an exemplary embodiment, a laser trimming process is performed to electrically separate the lines from each other, which are electrically connected through the connection line. During the laser trimming process, a first point LT1 and a second point LT2 of the test circuit 110 may be laser trimmed. When the first and second points LT1 and LT2 are laser trimmed, the output node N_out of the built-in light sensor 51 is electrically separated from the test circuit 110, and the output terminal of the test circuit 110 is electrically separated from the test pixel part 120. Since the test circuit 110 is not necessary in the display panel 50 after testing the built-in light sensor 51, the test circuit 110 is desirable to be electrically separated from the built-in light sensor 51 and the test pixel part 120 through the laser trimming process.

However, when the laser trimming process is not applied, the first and second points LT1 and LT2 may not be laser trimmed. Therefore, hereinafter, according to another exemplary embodiment of the present invention, a test circuit employed in a display panel to which the laser trimming process is not applied will be described.

Figure 4:
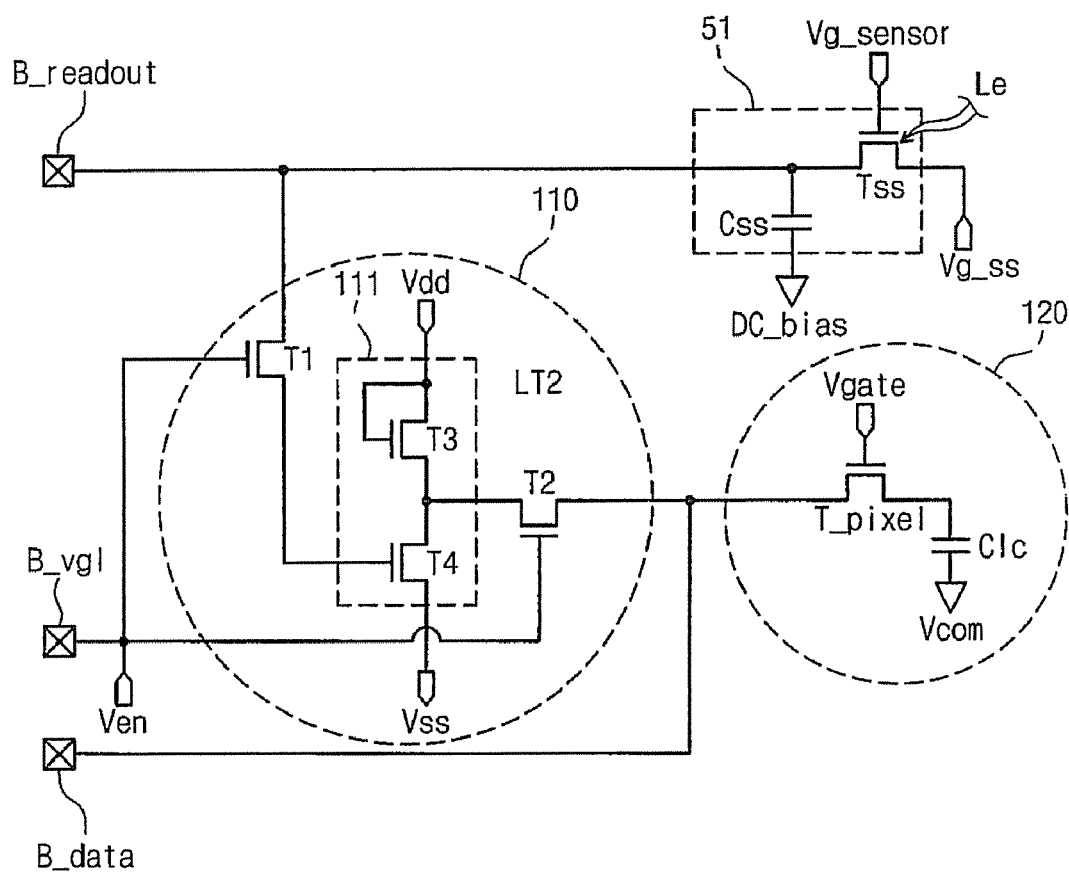
FIG. 4 is a circuit diagram showing an exemplary embodiment of a test circuit according to the present invention.

FIG. 4 is a circuit diagram showing another exemplary embodiment of a test circuit according to the present invention. In FIG. 4, the same reference numerals denote the same elements in FIG. 2, and thus the detailed descriptions of the same elements will be omitted.

Referring to FIG. 4, an enable terminal receiving an enable signal Ven is electrically connected to a low voltage bump B_vgl arranged on a display panel 50. The low voltage bump B_vgl is arranged on the display panel 50 in order to receive a gate low voltage from a driving chip that is mounted on the display panel 50 after a test procedure. The gate low voltage is provided to a gate driving circuit (not shown) which is directly formed on the display panel 50 through a thin film process and decides an off level of a gate voltage output from the gate driving circuit.

Since the test procedure is performed before the driving chip is mounted on the display panel 50, only the enable signal Ven is applied to control electrodes of a first transistor T1 and a second transistor T2 through the enable terminal. When the test procedure is completed, the enable signal Ven is prevented from being applied, and the gate low voltage output from the driving chip during an active period of the display panel 50 is applied to the control electrodes of the first and second transistors T1 and T2 through the low voltage bump B_vgl. Thus, the first and second transistors T1 and T1 are maintained in a turned-off state during the active period of the display panel 50, so that the test circuit 120 and the test pixel part 120 are electrically separated from each other. Accordingly, the test pixel parts 120 may display an image as well as pixels which display an image during the active period of the display panel 50.

Figure 5:
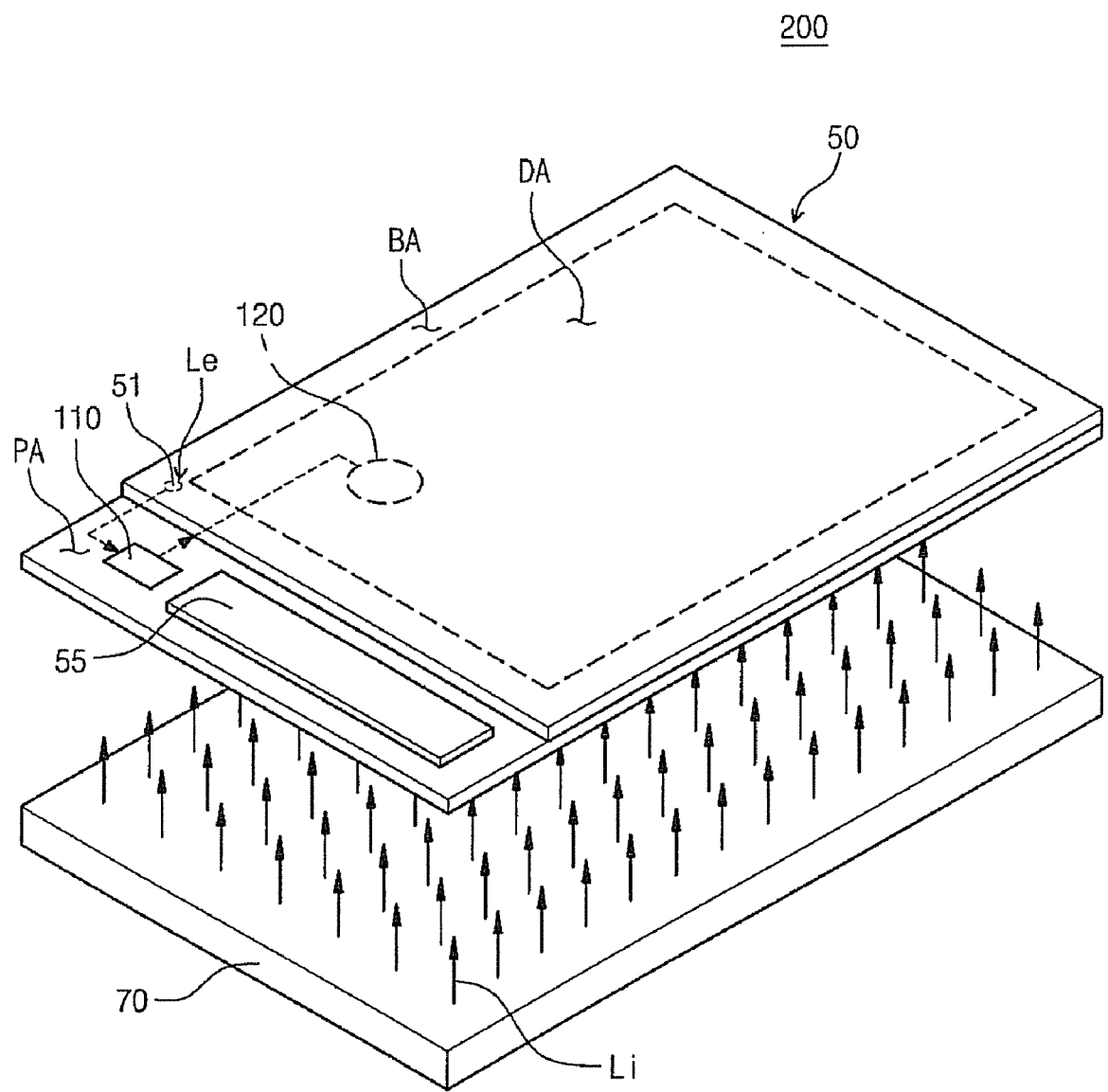
FIG. 5 is a perspective view showing an exemplary embodiment of a display apparatus according to the present invention.
Figure 6:
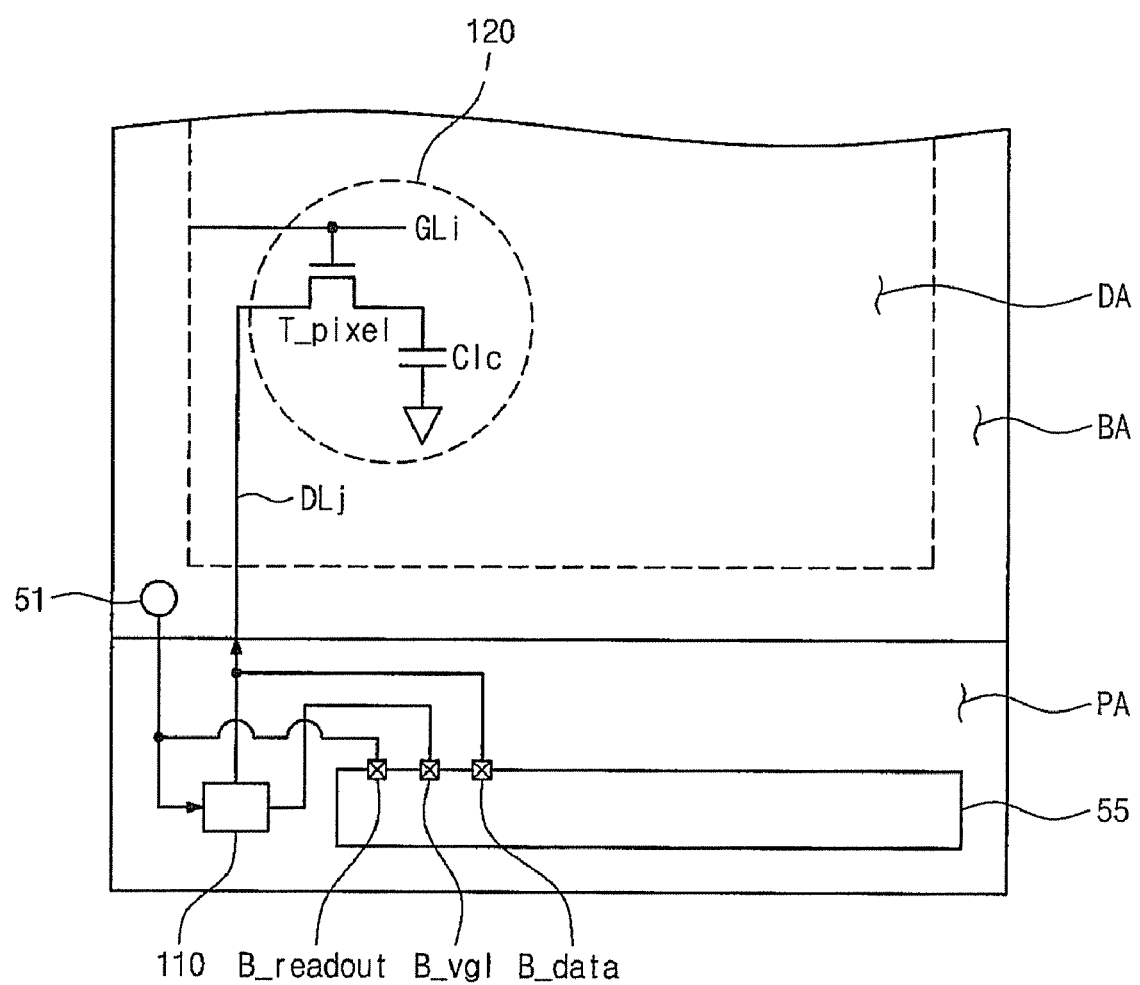
FIG. 6 is a plan view showing a display panel of FIG. 5.
Figure 7:
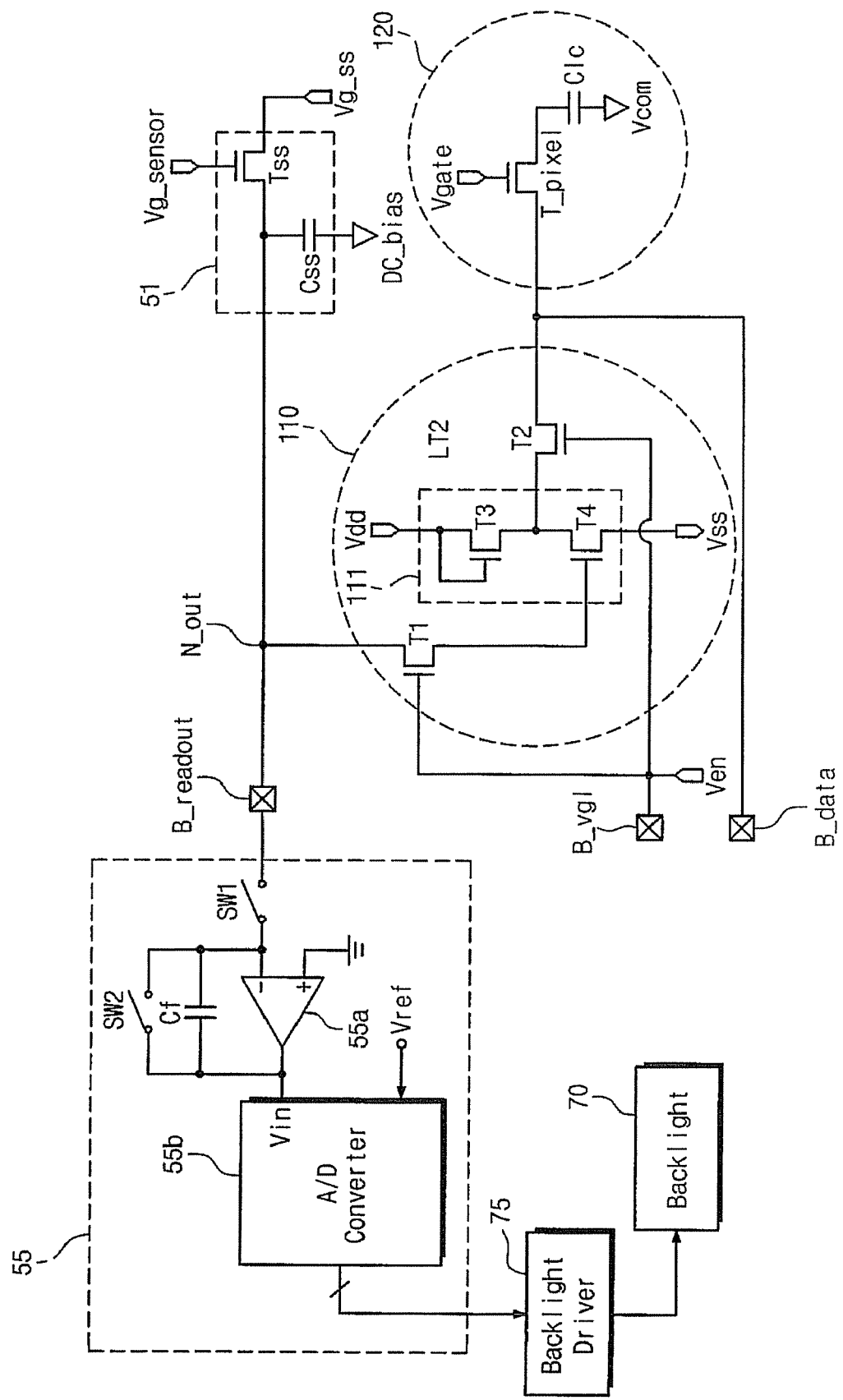
FIG. 7 is a circuit diagram showing a light sensor, a test circuit, a test pixel part, and a driving chip of FIG. 5.

FIG. 5 is a perspective view showing another exemplary embodiment of a display apparatus according to the present invention, FIG. 6 is a plan view showing a display panel of FIG. 5, and FIG. 7 is a circuit diagram showing a light sensor, a test circuit, a test pixel part, and a driving chip of FIG. 5.

Referring to FIGS. 5 and 6, a display apparatus 200 includes a backlight 70 generating an internal light Li and a display panel 50 displaying an image using the internal light Li.

The backlight 70 is arranged under the display panel 50. Although not shown in FIGS. 5 through 7, the backlight 70 may include a light source or a plurality of light sources generating the internal light Li and a light guide unit guiding the internal light Li to the display panel 50. The light source may include one or more light emitting diodes positioned adjacent to a lateral surface of a light emitting unit.

The display panel 50 displays the image using the internal light Li provided from the backlight 70. A built-in light sensor 51 that senses a brightness of an external light Le is arranged in a black matrix area BA of the display panel 50 in order to control an intensity of the internal light Li output from the backlight 70 according to the change of external circumstance of the display apparatus 200.

As shown in FIG. 7, a driving chip 55 mounted on the display panel 50 includes a circuit which receives a sensing signal output from the built-in light sensor 51 to output a signal corresponding to the intensity of the external light Le. The circuit of the driving chip 55 includes a first switch SW1, an op-amp 55a, a second switch SW2, a feedback capacitor Cf, and an A/D converter 55b.

The first switch SW1 is connected to a readout bump B_readout to receive the sensing signal output from the light sensor 51 and selectively provides the sensing signal to the op-amp 55a. In the current exemplary embodiment, the sensing signal is a voltage signal, for example.

The op-amp 55a amplifies the sensing signal and provides the amplified sensing signal to the A/D converter 55b. The amplified sensing signal is defined as an input voltage Vin of the A/D converter 55b, and the A/D converter 55b compares the input voltage Vin with a predetermined reference voltage Vref to output a control signal in a digital form in order to control a backlight driver 75.

In response to the control signal, the backlight driver 75 controls a voltage level of a driving voltage applied to the light source arranged in the backlight 70. Accordingly, in an exemplary embodiment, the backlight 70 outputs the internal light Li of which the intensity is controlled according to the level of the sensing signal output from the built-in light sensor 51. That is, when the intensity of external light Le is high, the backlight driver 75 decreases the intensity of internal light Li output from the backlight 70. Therefore, the display apparatus 200 controls the intensity of the internal light Li of the backlight 70 according to the intensity of the external light Le, so that a power consumption of the backlight 70 decreases in a place where the intensity of the external light Le is high.

A test circuit 110 is arranged in a peripheral area PA of the display panel 50. The test circuit 110 is used to test the built-in light sensor 51 during a test procedure of the display panel 50.

The test circuit 110 is electrically connected to the built-in light sensor 51 and a test pixel part 120 in response to an enable signal Ven during the test procedure. However, when the driving chip 55 is mounted on the display panel 50 and a gate low voltage is applied to a low voltage bump B-vgl, the test circuit 110 is electrically separated from the built-in light sensor 51 and the test pixel part 120. Thus, the test circuit 110 does not affect any influence to the built-in light sensor 51 and the test pixel part 120 during an active period of the display panel 50.

According to the above, the test circuit 110 connected to the built-in light sensor 51 is arranged on the display panel 50 to test the built-in light sensor 51 that senses the intensity of the external light. The brightness of the pixels operated by the test circuit 110 is measured by the brightness measurer 130. Thus, the light sensor test unit 100 may test whether the built-in light sensor 51 is normally operated.

While the present invention has been shown and described with reference to some exemplary embodiments thereof, it should be understood by those of ordinary skill in the art that various changes in form and details may be made therein without departing from the spirit and scope of the present invention as defined by the appended claims.

What is claimed is:

1. A light sensor test unit built in a display panel to test a light sensor that senses an external light, the light sensor test unit comprising:

a test circuit connected to an output node of the light sensor, which outputs a driving signal in response to a sensing signal output from the output node, when the external light having a predetermined intensity is applied to the light sensor;

a test pixel part comprising pixels selected from a plurality of pixels arranged in a display area of the display panel, which receives the driving signal from the test circuit to display a gray-scale corresponding to the driving signal on a screen of the display panel;

a brightness measurer which measures a brightness corresponding to the gray-scale displayed on the test pixel part; and a controller which compares the measured brightness with a predetermined brightness to test whether the light sensor is normally operated, wherein the test circuit is arranged in a peripheral area of the display panel, and the brightness measurer is positioned above the screen of the display panel to measure the brightness of the test pixel part.

2. The light sensor test unit of claim 1, wherein the test circuit comprises:

a first switching device connected to the output node, which outputs the sensing signal from the output node in response to an enable signal;

an inverter which outputs either a first voltage or a second voltage as the driving signal in response to the sensing signal output from the first switching device; and a second switching device which switches the driving signal output from the inverter in response to the enable signal.

3. The light sensor test unit of claim 2, wherein the first switching device comprises a first transistor including a first control electrode which receives the enable signal, a first input electrode which receives the sensing signal from the output node, and a first output electrode which outputs the sensing signal, and the second switching device comprises a second transistor including a second control electrode which receives the enable signal, a second input electrode which receives the driving signal from the inverter, and a second output electrode which outputs the driving signal.

4. The light sensor test unit of claim 3, wherein the inverter comprises:

a third transistor including a third control electrode and a third input electrode connected to a first voltage terminal to which the first voltage is applied, and a third output electrode connected to the second input electrode; and a fourth transistor including a fourth control electrode connected to the first output electrode of the first transistor, which receives the sensing signal, a fourth input electrode connected to the third output electrode of the third transistor, and a fourth output electrode connected to a second voltage terminal to which the second voltage is applied.

5. The light sensor test unit of claim 4, wherein the first voltage is a driving voltage of the display panel, and the second voltage is a ground voltage.

6. The light sensor test unit of claim 2, wherein the test circuit further comprises an enable terminal which is connected to the first and second switching devices and applies the enable signal.

7. The light sensor test unit of claim 6, wherein the pixels are driven in response to a gate signal, and the enable terminal is connected to a low voltage bump and receives a gate low voltage which determines a low level of the gate signal from a driving chip among bumps arranged on the display panel in order to be electrically connected to the driving chip mounted on the display panel.

8. The light sensor test unit of claim 7, wherein the display panel is divided into a display area in which the pixels are arranged to display an image, a black matrix area which is adjacent to the display area, and a chip mounting area in which the driving chip is mounted, the light sensor is arranged in the black matrix area, and the test circuit is arranged adjacent to the chip mounting area.

* * * * *